United States Patent [19]
Anderson et al.

[11] Patent Number: 5,790,127
[45] Date of Patent: Aug. 4, 1998

[54] SUPERVISING ACTIVATIONS STATES IN APPLICATION SHARING

[75] Inventors: David L. Anderson, Portland; William C. DeLeeuw, Hillsboro, both of Oreg.

[73] Assignee: Intel Corporation, Santa Clara, Calif.

[21] Appl. No.: 642,402

[22] Filed: May 3, 1996

[51] Int. Cl.$^6$ ........................ G06F 3/00
[52] U.S. Cl. .............. 345/343; 345/330; 345/332; 395/200.34
[58] Field of Search ............... 395/326–358, 395/200.04, 200.01, 200.34–200.37; 345/326–358

[56] References Cited

U.S. PATENT DOCUMENTS

| | | | |
|---|---|---|---|
| 4,974,173 | 11/1990 | Stefik | 395/331 |
| 5,107,443 | 4/1992 | Smith et al. | 395/332 |
| 5,363,507 | 11/1994 | Nakayama et al. | 395/330 |
| 5,442,788 | 8/1995 | Bier | 395/329 |
| 5,515,491 | 5/1996 | Bates et al. | 395/331 |
| 5,530,795 | 6/1996 | Wan | 395/330 |
| 5,557,725 | 9/1996 | Ansberry et al. | 395/330 |

OTHER PUBLICATIONS

Ishii, "TeamWorkStation: Towards a Seamless Shared Workspace", CSCW 90 Proceedings, pp. 13–26, Oct. 1990.
Ahuja et al., "A Comparison of Application Sharing Mechanisms in Real–Time Desktop Conferencing Systems", ACM, pp. 238–248, Apr. 1990.
Ishii et al., "Design of TeamWorkStation: A Realtime Shared Workspace Fusing Desktops and Computer Screens", IFIP, pp. 131–142, 1990.
Ellis et al., "GroupWare", Comm. of the ACM, pp. 38–58, Jan. 1991.
Foster et al., "Cognoter, Theory and Practice of a Colab–orative Tool", CSCW '86, pp. 7–15, 1986.

*Primary Examiner*—John E. Breene
*Attorney, Agent, or Firm*—Duane, Morris & Heckscher LLP

[57] ABSTRACT

In application sharing, an activation message to one of an application-sharing application and a shared application is monitored. One or both of the application-sharing application and the shared application are supervised by the application-sharing application based on the activation message. In an embodiment, where the activation message calls for one of an activation or deactivation of the shared application, the application-sharing application respectively renders at least a portion of its own graphical user interface in an active or inactive color. An embodiment further prevents deactivation of an application when the activation message is for an activation of the application-sharing application.

29 Claims, 13 Drawing Sheets

SUPERVISING ACTIVATIONS STATES IN APPLICATION SHARING

BACKGROUND OF THE INVENTION

1. Field of the Invention

This invention relates to the field of computers and in particular to application sharing.

2. Description of the Related Art

A windowed operating system, for example, a "MICROSOFT" "WINDOWS" operating system, running on a computer system having a display monitor, provides on the display monitor window-like graphical user interfaces (GUI) which allow users to interface with and input to applications running on the computer in conjunction with the operating system. FIGS. 1A and 1B show typical window-like GUIs generated by a windowed operating system and depict typical GUI activity in a windowed operating system environment.

In FIG. 1A, monitor 23 displays window-like GUI 12 of application 14 and window-like GUI 13 of application 15. GUI 12 includes caption 16. GUI 13 includes caption 17. Windowed operating systems typically permit only a single application at a time to be active. Therefore, according to standard windowed operating system functionality, only a single GUI window on a monitor, such as monitor 23, will have a caption rendered or "painted" in an active color at any one time. For example, in FIG. 1A, caption 16 is painted the active color (which can be any color but is represented by black in FIG. 1A). Caption 17 of GUI 13 necessarily, according to typical windowed operating system functionality, is painted the inactive color (which can be any color other than the active color but is represented by white in FIG. 1A). Furthermore, according to typical windowed operating system functionality, the window-like GUI of an activated application is made to appear as if it overlays the window-like GUI of any other open applications. For example, as shown in FIG. 1A, application 14 GUI 12 overlays application 15 GUI 13. This behavior is known in windowed operating system parlance as arranging the GUIs in appropriate "Z-order."

Typically, inputting to, activating or requesting some service of application 15, such as by moving a mouse cursor to within the bounds of GUI 13 and clicking a mouse button one or more times or repeatedly depressing the Tab key on a keyboard while holding the Alt key down until an appropriate icon appears and simultaneously releasing the keys, causes the previously active application to be deactivated and the previously inactive application to be activated. This is illustrated in FIG. 1B. Application 15 has been activated, for example by one of the methods discussed above. This results in deactivation of application 14 and painting of its caption 16 white, the inactive color. Correspondingly, application 15 is activated and its caption 17, is painted black, the active color. Appropriate Z-ordering is achieved by the operating system: application 15 GUI 13 is overlaid on application 14 GUI 12. Of course, any subsequent activation of application 14 will cause a reversion to the scenario depicted in FIG. 1A. Furthermore, the above-described windowed operating system functionality is not limited to two running applications. More than two applications can be running; therefore, the number of window-like GUIs which must be arranged in appropriate Z-order and captions of window-like GUIs among which activation coloration can oscillate is limited primarily by the hardware which must run the applications. In any event, typical windowed operating systems permit activation and active coloration of the caption of only one application at a time.

The behavior discussed above of typical windowed operating systems with respect to caption coloration can cause problems and confusion during application sharing. Application sharing concerns the sharing of one or more application programs by two or more users using computers at remote locations. The one or more applications being shared reside on a host computer and are shared by the host and one or more other computers, called guests. In order to share the application ("the shared application"), the host and each guest run dedicated other applications, for example an application-sharing application. In conventional application-sharing configurations, the normal functionality of windowed operating systems can confuse an application-sharing user in that at any one time, the caption of either the shared application GUI or the application-sharing GUI are painted the inactive color. A user might be made uncertain of his continued ability to enter input into the shared application or even whether the shared-application is still being shared. It should be apparent, therefore, that in application-sharing it is desirable to simultaneously provide the captions of two applications, the shared application and the application-sharing application, with active coloration in contravention of the behavior of normal windowed operating systems.

SUMMARY OF THE INVENTION

In application sharing, an activation message to one of an application-sharing application and a shared application is monitored. One or both of the application-sharing application and the shared application are supervised by the application-sharing application based on the activation message.

BRIEF DESCRIPTION OF THE DRAWINGS

The following detailed description will be more fully understood with reference to the accompanying drawings in which.

DETAILED DESCRIPTION OF THE PREFERRED EMBODIMENT

Figure 1A:
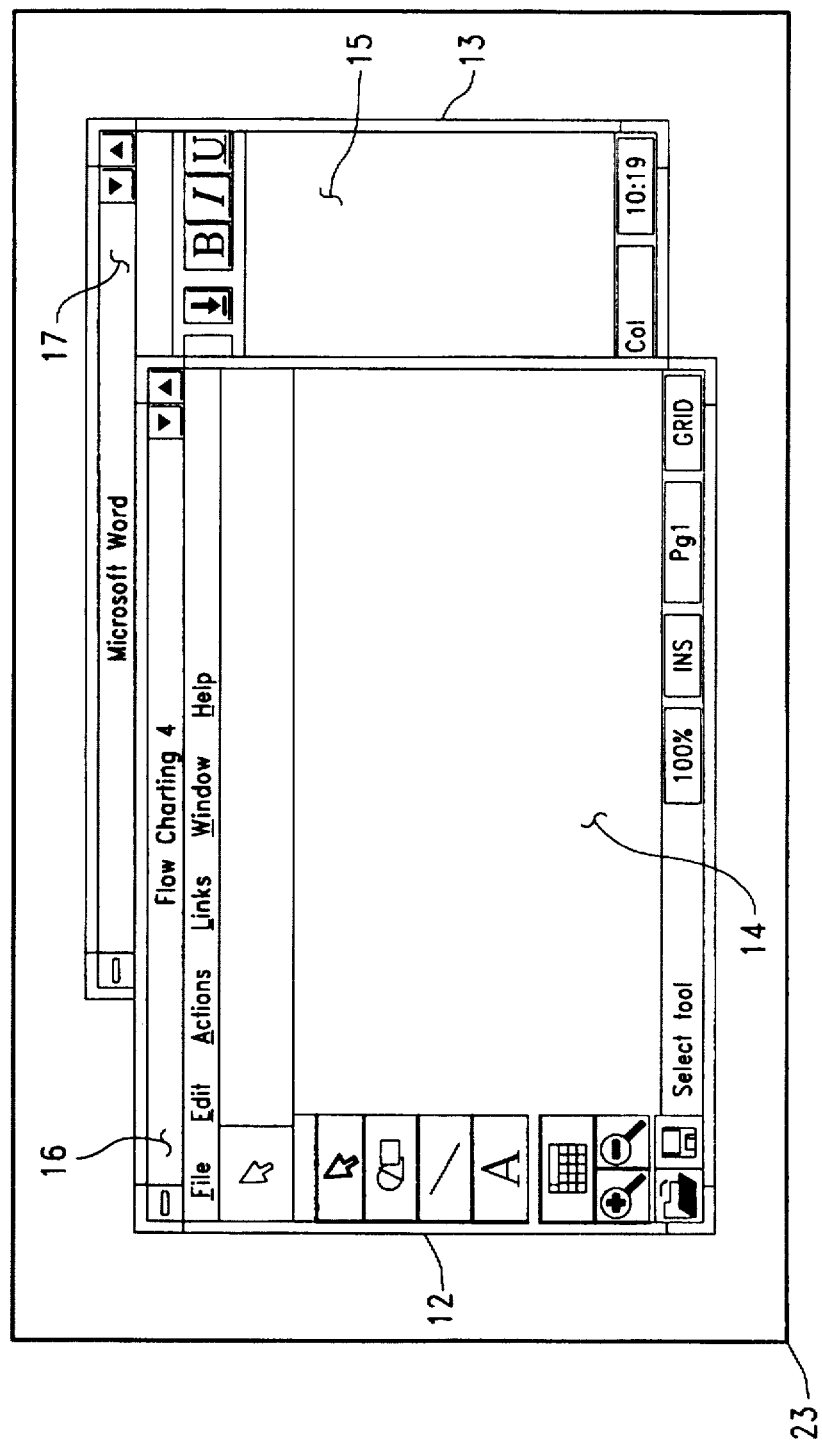
FIGS. 1A and 1B are a replication of window-like GUIs showing conventional GUI activity for two open applications in a windowed operating system environment.
Figure 1B:
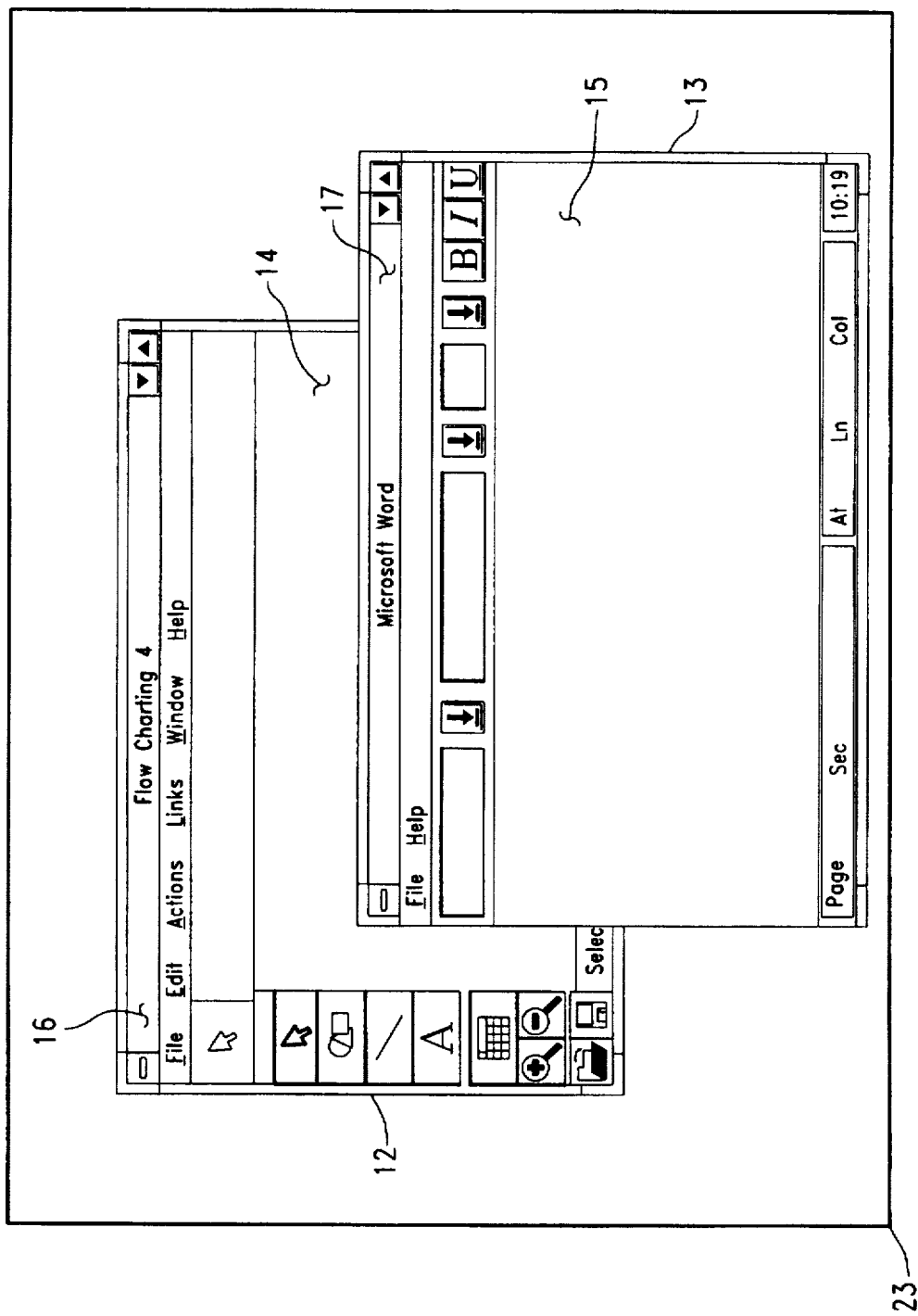
Figure 2:
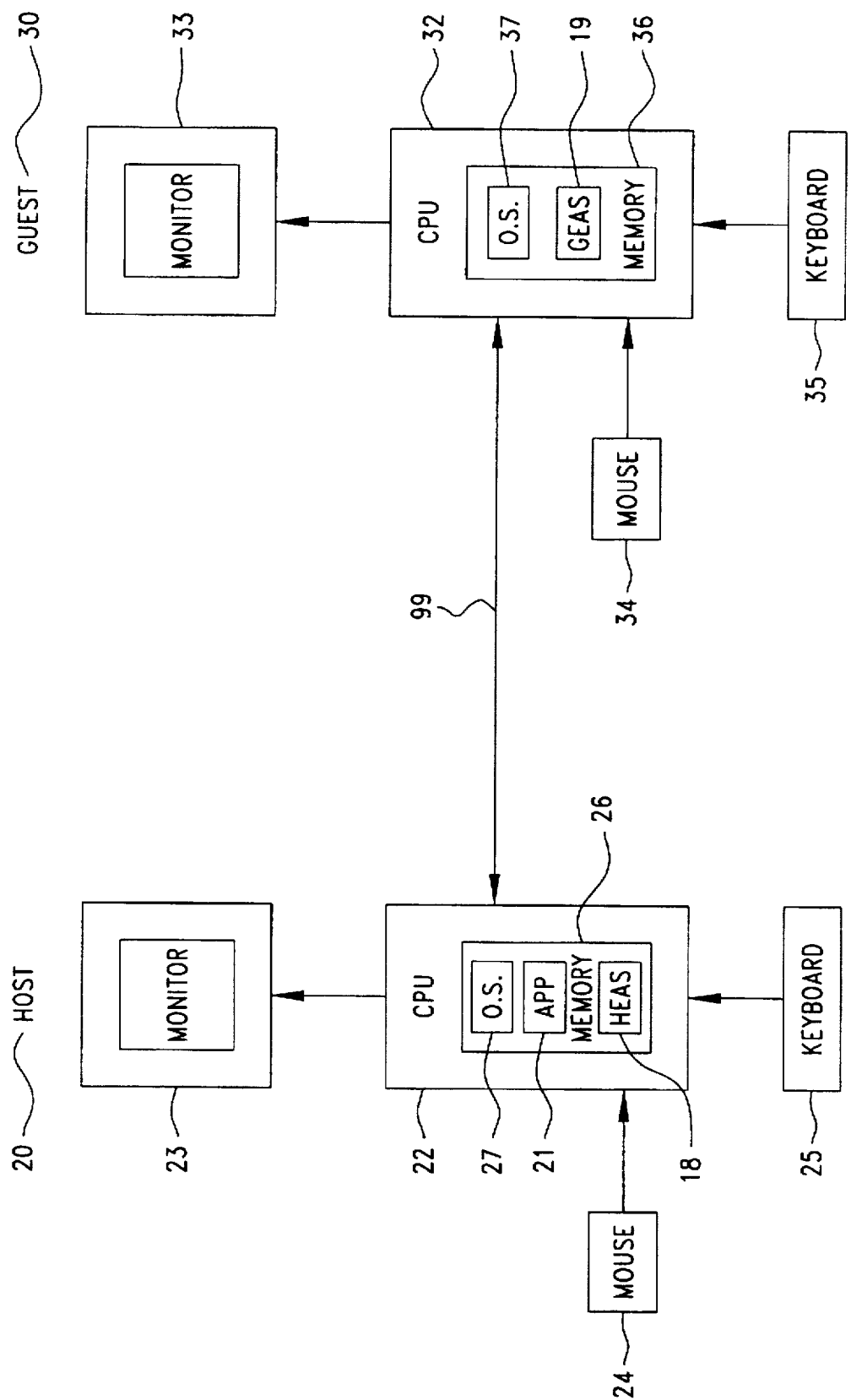
FIG. 2 is block diagram of an application-sharing configuration according to the invention.

Referring now to FIG. 2, a block diagram of a typical application-sharing hardware configuration, application 21 resides in memory 26 on a host 20 having, for example, central processing unit (CPU) 22, monitor 23, mouse 24 and keyboard 25 and is shared with one or more guest computers, such as guest 30. Guest 30 has CPU 32, monitor 33, mouse 34 and keyboard 35. Guest 30 also has main memory 36. Each of host 20 and guest 30 include windowed operating systems 27 and 37, respectively. Host 20 and guest 30 also are provided with application-sharing software, such as host-executed application-sharing (HEAS) software 18 and guest-executed application-sharing software (GEAS) 19. HEAS 18 and GEAS 19 enable host 20 and guest 30 to share application 21, for example over network coupling 99. The invention, typically implemented in, for example, HEAS 18, monitors activation messages and supervises activation of application 21 and HEAS 18 and GUI caption coloration of HEAS 18 to simplify application sharing and eliminate user confusion during application sharing.

Figure 3A:
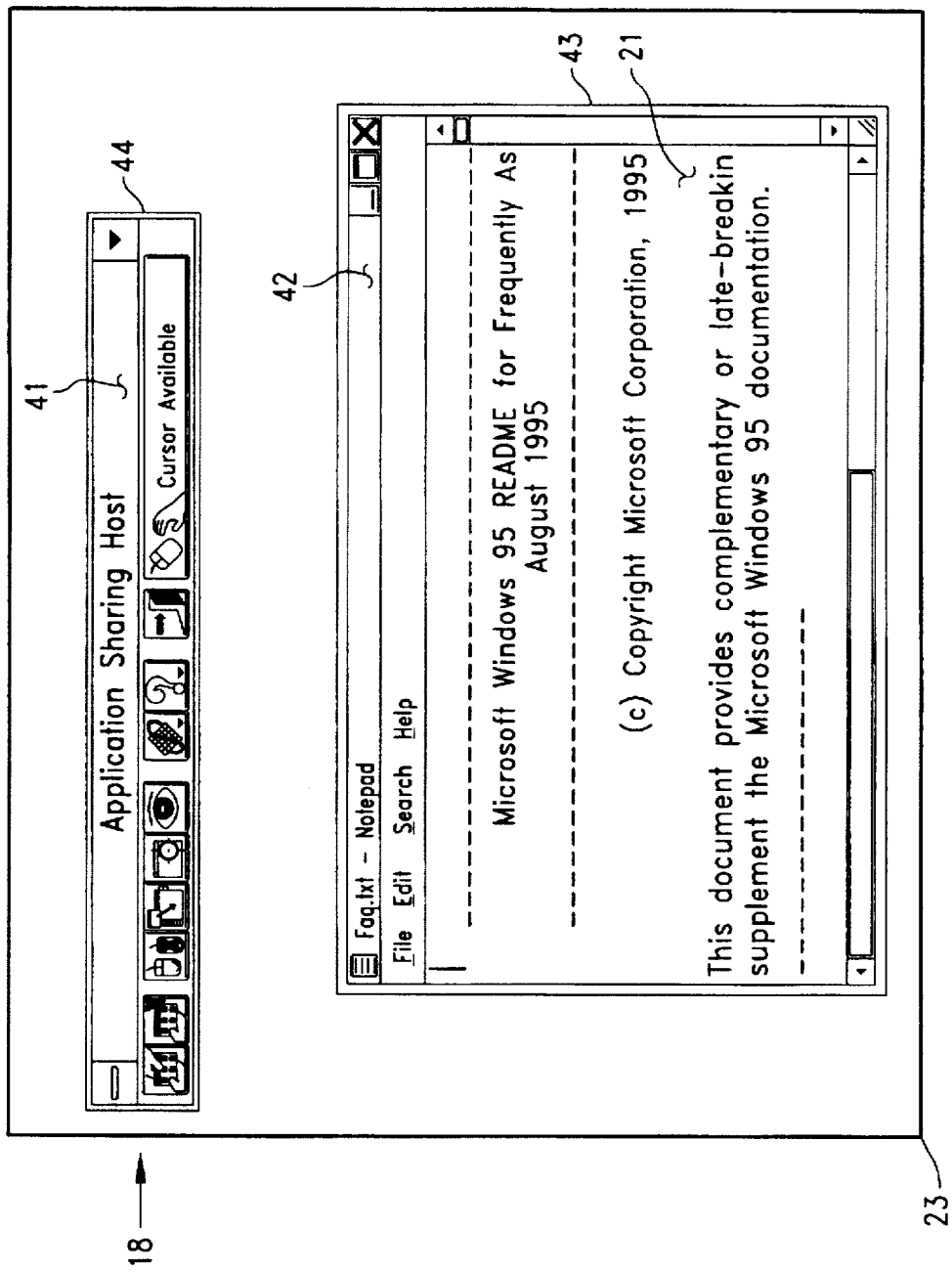
FIGS. 3A and 3B are replications of the GUIs of the host-executed application-sharing (HEAS) application and of a first application showing sharing of the first application.
Figure 3B:
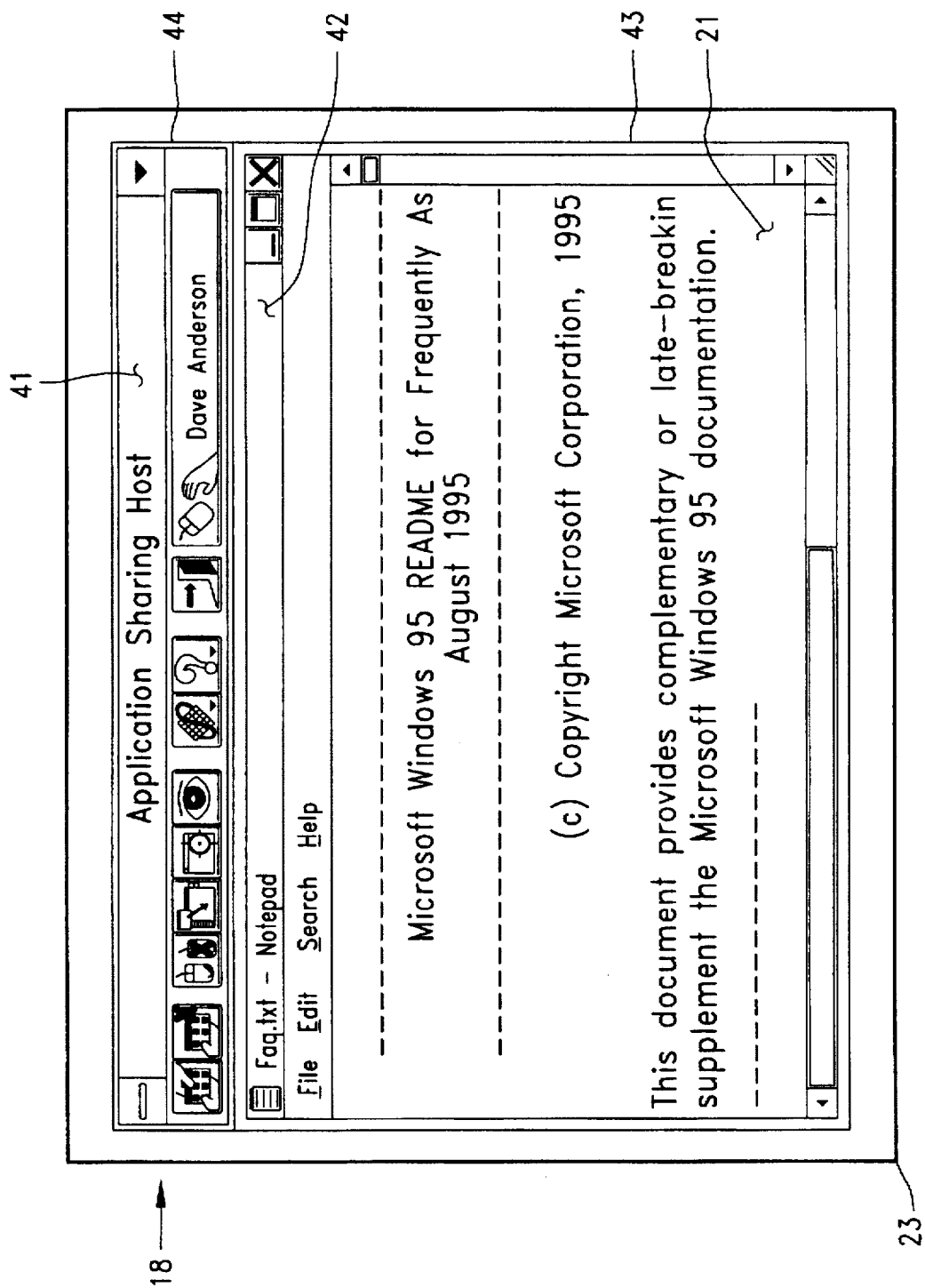
Figure 3C:
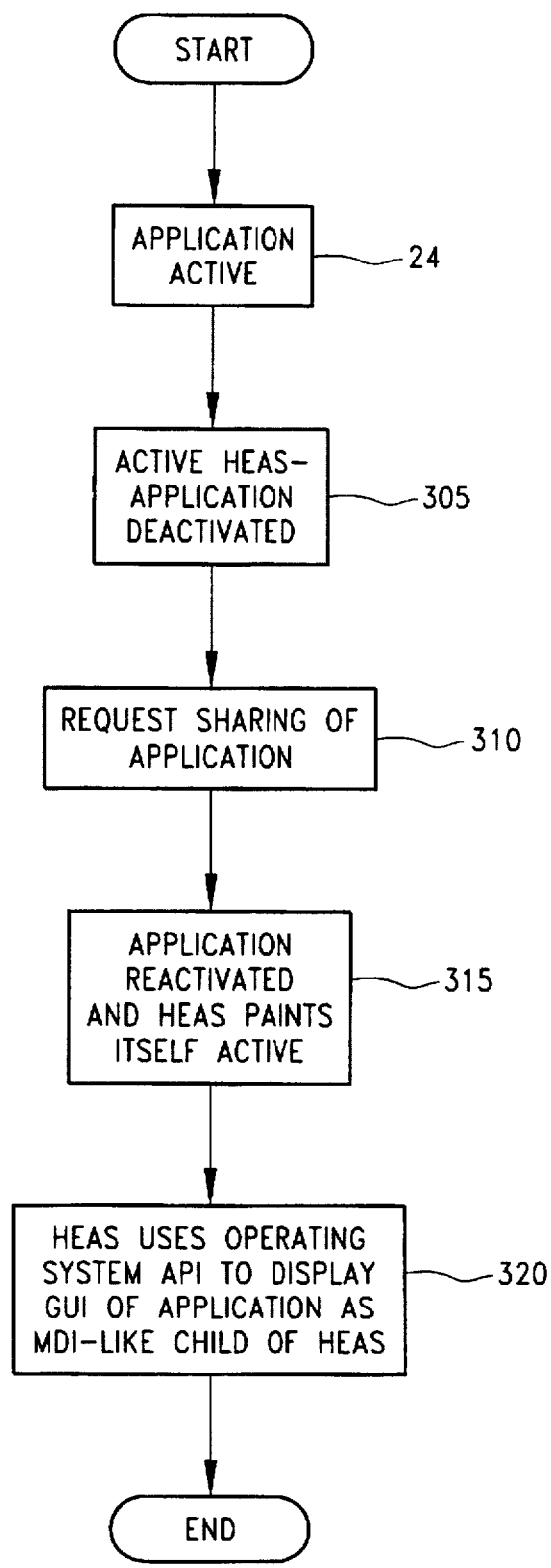
FIG. 3C and 3D are flow charts of the steps illustrated in FIGS. 3A and 3B.

Referring now to FIG. 3A, a replication of GUI 44 of HEAS 18 and GUI 43 of application 21, and FIG. 3C, a flow chart showing one method for sharing an application according to the invention, HEAS 18, having GUI 44 and caption 41, is running but is inactive and has not been instructed to share application 21. Caption 41 of GUI 44 is painted the inactive color. Application 21, having GUI 43 and caption 42 is running and is active. Caption 42 is painted the active color (step 300 of FIG. 3C).

Referring now also to FIG. 3B, which is a replication of the GUI 44 of HEAS 18 and GUI 43 of application 21 during the sharing of application 21 according to the invention, a user, for example at host 20, can activate HEAS 18 for the purposes of requesting the sharing of application 21 (step 305) in a manner known to those skilled in the art, for example, by using mouse 24 to move a mouse cursor to and click on an appropriate one of the buttons displayed in HEAS GUI 44. As known to those skilled in the art, such an action typically causes operating system 27 to generate an activation message, such as a WM_MOUSEACTIVATE message in "MICROSOFT" "WINDOWS" operating systems, for activating HEAS 18. Although not shown, application 21 will be deactivated and its caption 42 painted the inactive color by operating system 27 upon activation of HEAS 18 (step 305). However, after requesting sharing of application 21 (step 310), HEAS 18 will cause reactivation of application 21 and will paint itself the active color (step 315). Moreover, HEAS 18 interfaces with an Application Programming Interface (API) of windowed operating system 27 to provide a Multiple Document Interface (MDI) type of display with HEAS GUI 44 being the parent and application GUI 43 the child (step 320). In the MDI configuration of two or more window-like GUIs, the window-like GUI of one or more children applications are contained completely within the window-like GUI of the parent application. For example, referring to FIG. 3B, note the alignment of application GUI 43 entirely within the boundaries of HEAS GUI 44. In a "MICROSOFT" "WINDOWS" operating system environment, an embodiment of the invention might use the <SetWindowPos> API call to implement the MDI-type configuration shown in FIG. 3B.

The results of steps 305–320 of the invention are shown in FIG. 3B. Captions 41 and 42 of HEAS 18 and shared application 21 are painted in the active color, making the active status of the application-sharing configuration and the users ability to enter data into shared application 21 plainly apparent to a user. The GUI windows 44 of HEAS 18 and 43 of application 21, respectively, are arranged in an MDI-type view. The display produced by the invention and shown in FIG. 3B is aesthetically useful and also assists a user by merging GUI 43 and GUI 44 into what appears to the user to be a single GUI, thereby simplifying application sharing for the user.

Figure 3D:
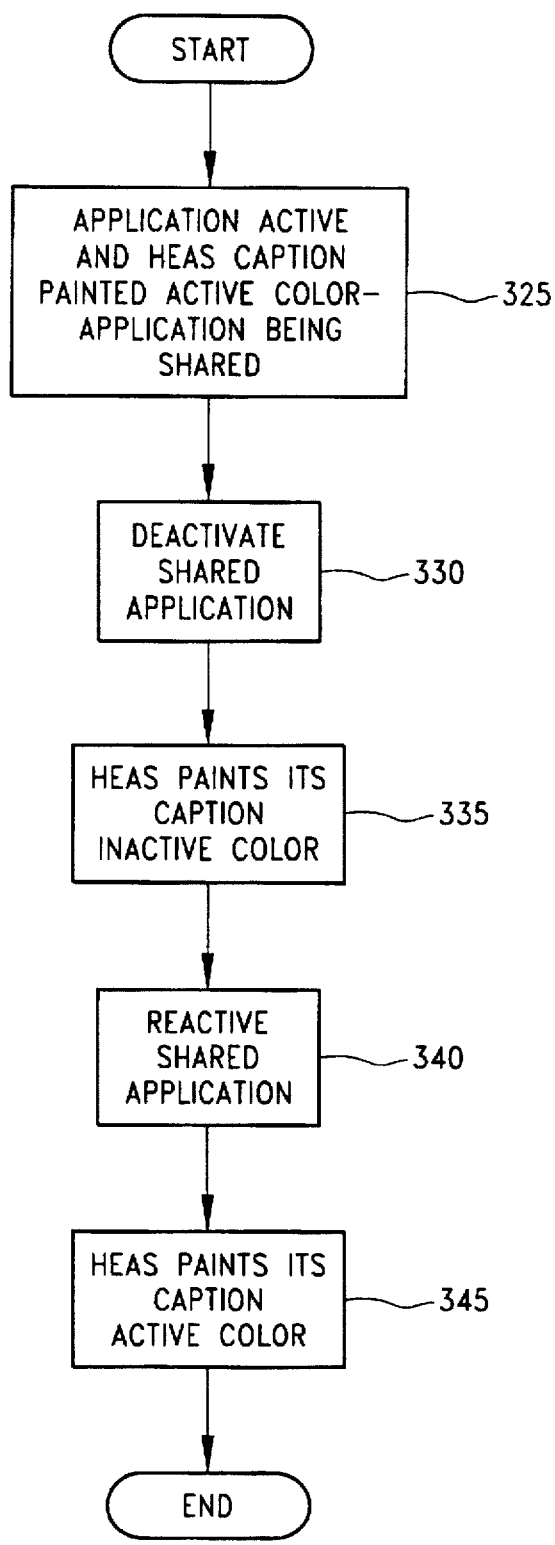

Referring also now to FIG. 3D, which is a flow chart of the functionality of the invention when application 21 is deactivated and reactivated while being shared, at the point shown in FIG. 3B (step 325 of FIG. 3D), HEAS 18 is privy to various messages being delivered to application 21. For example, HEAS 18, and more particularly according to an embodiment of the invention, an engine component in HEAS 18, hooks deactivation messages sent by operating system 27 to deactivate shared application 21. Should operating system 27 be instructed to deactivate application 21 (step 330), the engine of HEAS 18 will notify HEAS 18, and more particularly according to an embodiment of the invention, a framer component of HEAS 18, of the deactivation of shared application 21. The framer, which controls the display of HEAS GUI 44 will paint caption 41 the inactive color in response to the deactivation of shared application 21 (step 335). Should shared application 21 subsequently be reactivated by a user (step 340), the engine of HEAS 18 will be privy to the activation message sent by operating system 27. The engine will instruct the framer to paint caption 41 the active color (step 345), again providing the display and behavior shown in FIG. 3B. The aspect of an embodiment of the invention which provides the MDI behavior is utilized once again during the reactivation of application 21 to properly position GUI 44 and GUI 43 in the MDI-like orientation. For example, HEAS 18 will hook the activation call and issue the <SetWindowPos> or some equivalent API call to implement the MDI-like orientation.

Operating systems typically treat any attempt to input to any running application as a request to activate the application. In conventional application sharing systems, simple requests to an application-sharing application to provide some service, such as a request to center the shared application on a monitor or a request for control of input rights to the shared application ("the turn"), typically result in deactivation of the shared application. In the invention, HEAS 18 intercepts and processes the activation calls from operating system 27, which may be, for example, WM_MOUSEACTIVATE calls in "MICROSOFT" "WINDOWS" operating systems, and deflects them to the shared application 21 to prevent operating system 27 from deactivating shared application 21. Therefore, referring to FIG. 3B, if a user requests some service of HEAS 18 during the sharing of application 21, HEAS 18 communicates with operating system 27 to advise it not to activate HEAS 18, thus preventing application 21 from being deactivated. HEAS 18 will keep its caption 41 painted in the active color. Execution by HEAS 18 of the particular service requested will be unaffected. In the event the requested service entails a need for entering additional information, for example, via a drop-down menu or dialog box, application 21 will temporarily be deactivated but can be reactivated immediately by HEAS 18 after the dialog box is dismissed.

Figure 4A:
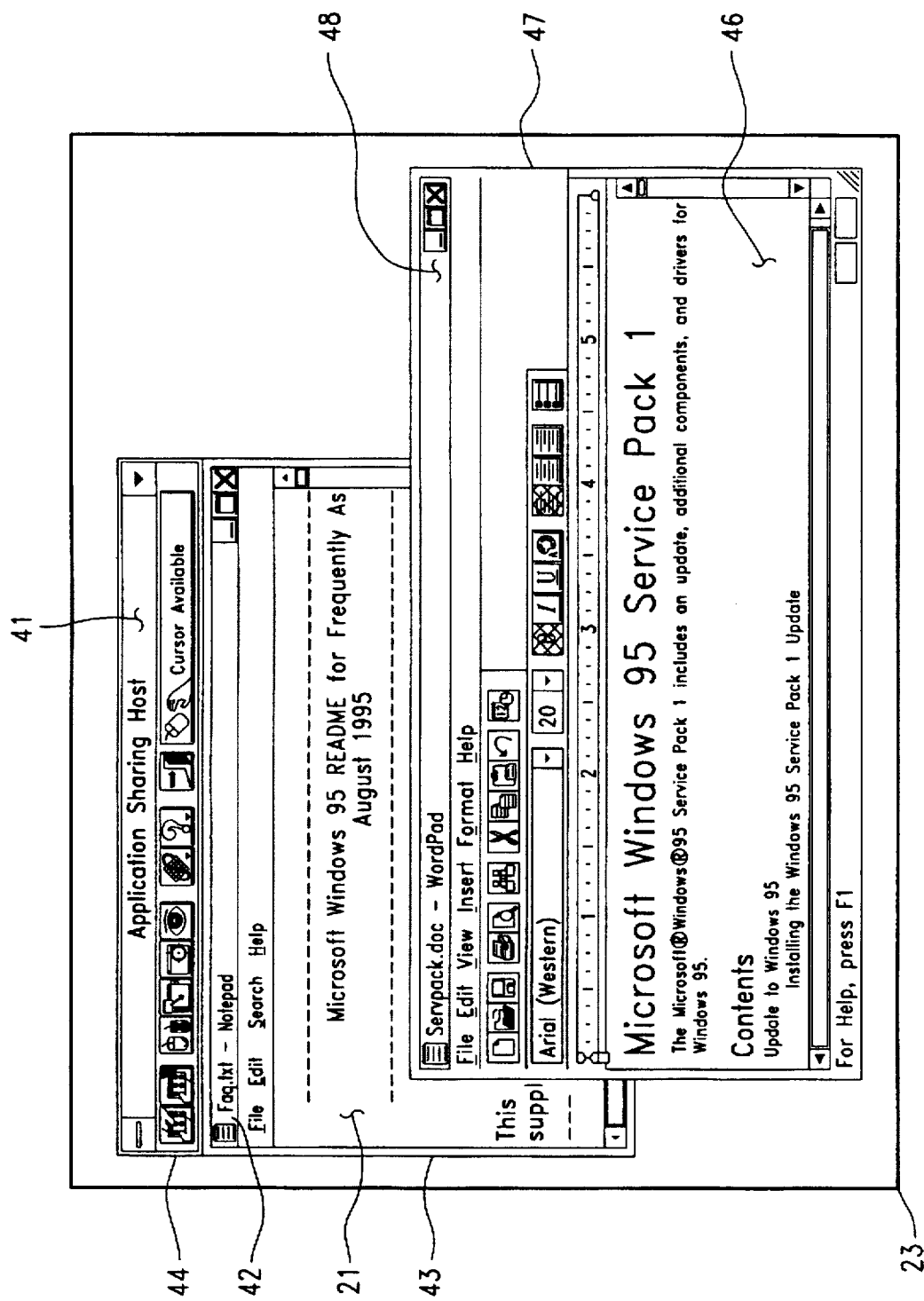
FIG. 4A is a replication of the GUIs of the HEAS, the first application and a second application when the second application is activated and the first application, which was being shared, is deactivated.
Figure 4B:
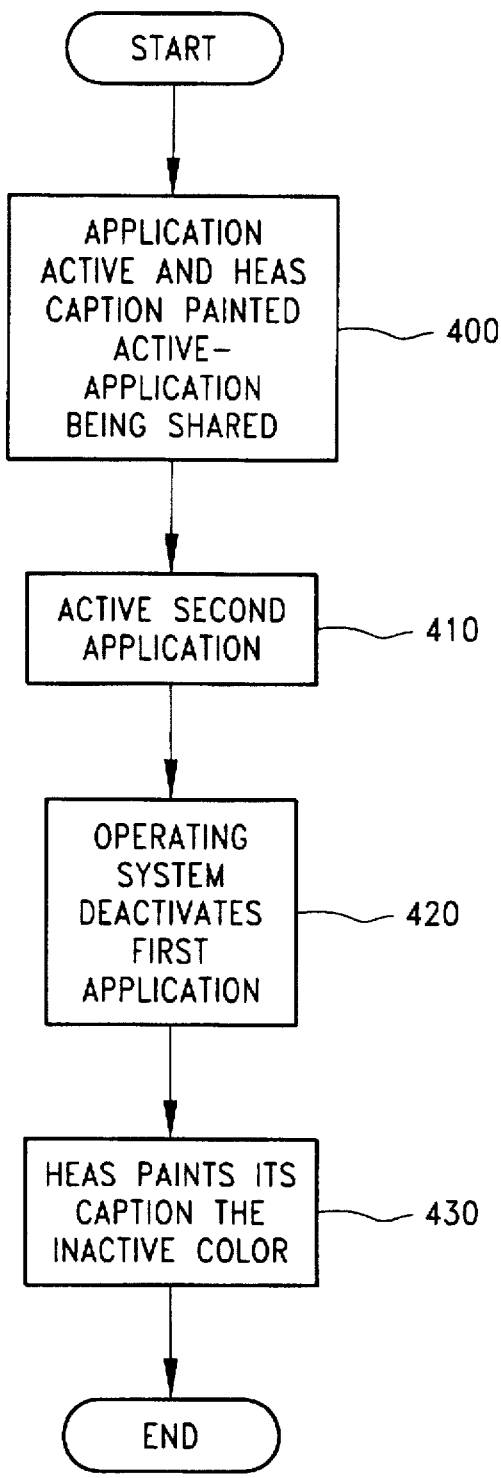
FIG. 4B is a flow chart showing the steps illustrated in FIG. 4A.

FIGS. 4A and 4B show a screen replication and the steps involved when opening a second application. From the scenario depicted in FIG. 3B (HEAS 18 painted active and sharing activated application 21) (step 400 of FIG. 4B), a user has activated non-shared application 46, having GUI 47 and caption 48, which are overlaid (Z-ordered) by operating system 27 on HEAS GUI 44 and application 21 GUI 43 on monitor 23 (step 410). As discussed above with respect to typical windowed operating systems, activation of application 46 necessarily entails deactivation of application 21 by operating system 27 (Step 420). HEAS 18 hooks the message from operating system 27 to deactivate application 21 and instructs the framer of HEAS 18 to paint HEAS caption 41 the inactive color (step 430).

As shown in FIG. 4A, application GUI 43 continues to appear as an MDI child window of HEAS GUI 44; however, HEAS caption 41 and application caption 42 are painted the inactive color. Application 46 is independent of application 21. Furthermore, GUI 47 of application 46 does not appear as a MDI child window of HEAS GUI 44 but has been overlaid on application 21 GUI 43 by operating system 27.

Figure 5A:
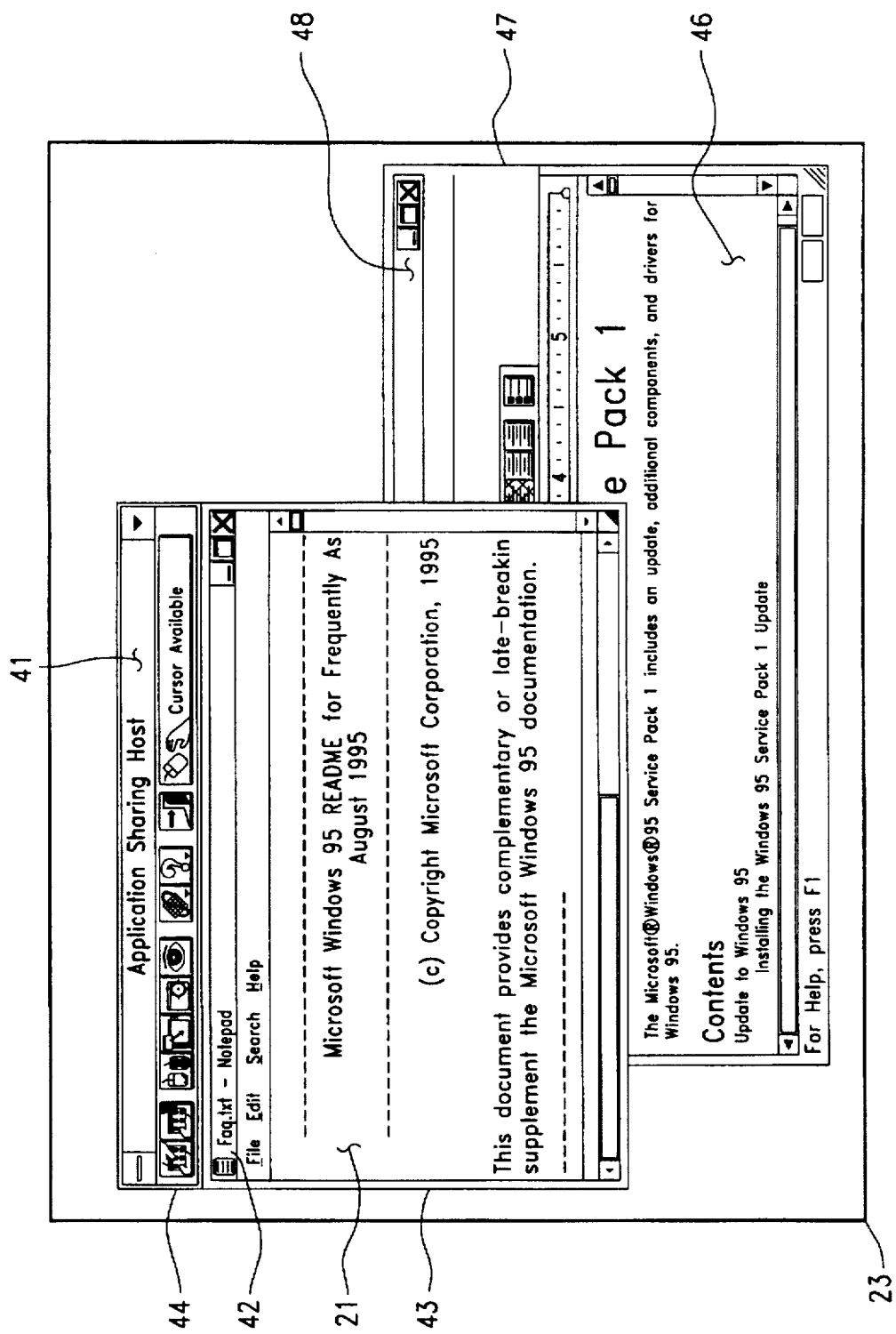
FIG. 5A is a replication of the GUIs of the HEAS and first and second applications when sharing of the first application is resumed.
Figure 5B:
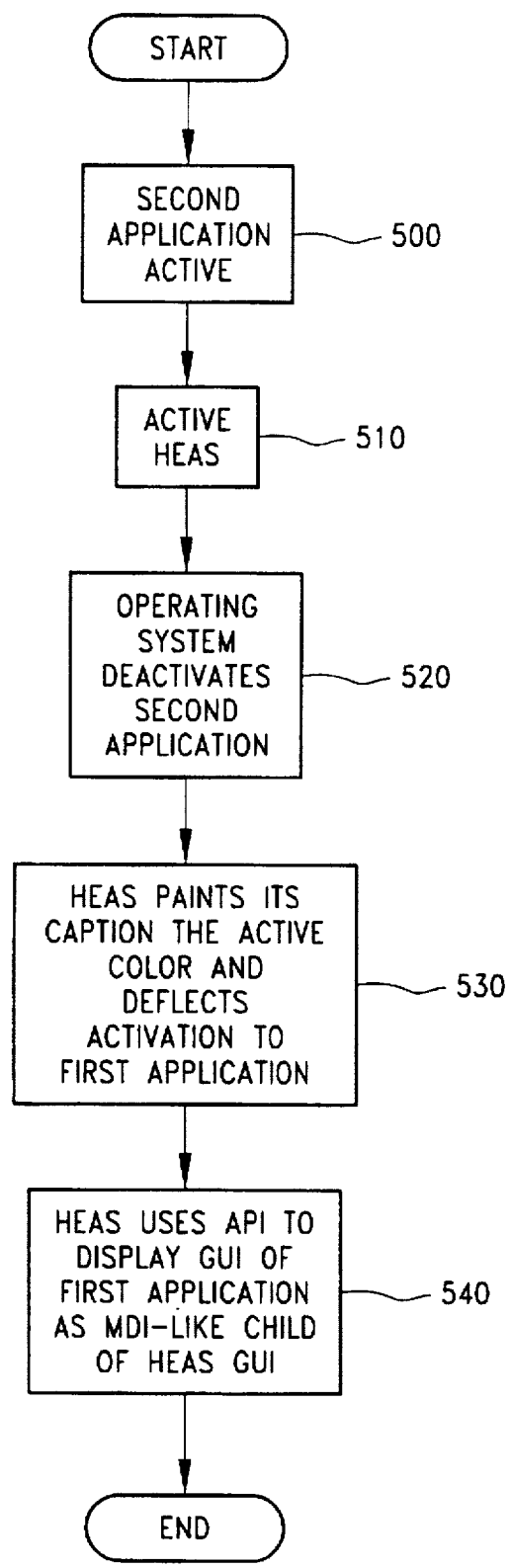
FIG. 5B is a flow chart showing the steps illustrated in FIG. 5A.

Referring now to FIGS. 5A and 5B, from the scenario depicted in FIG. 4A, while second application 46 is active (step 500 of FIG. 5B) a user has requested activation of HEAS 18 (step 510). This could occur in a number of ways. For example, a user could move a mouse cursor within the bounds of HEAS GUI 44 using mouse 24 and click a button on mouse 24. A user also could repeatedly depress the Tab key while simultaneously holding down the Alt key on keyboard 25 until an appropriate icon for HEAS 18 is displayed, at which point each key can be released. In any event, operating system 27 will issue an activation message, such as a WM_MOUSEACTIVATE or WM_ACTIVATE message in "MICROSOFT" "WINDOWS" operating systems, depending on the nature of the activation, and will deactivate application 46, as evidenced by caption 48 being painted the inactive color (step 520). HEAS 18 will paint its caption 41 active, activate application 21, and, in the case of attempted activation by a WM_MOUSEACTIVATE or equivalent message, communicate with operating system 27 to block activation of HEAS 18 (step 530). HEAS 18 "deflects" its activation to application 21. In the case of attempted activation by a WM_ACTIVATE or equivalent message, HEAS deflects activation (step 530) by accepting activation by operating system 27 but essentially immediately thereafter activating application 21. The sharing of application 21 can commence. Operating system 27 overlays active application 21 on inactive application 46. HEAS 18 makes an API call, such as a <SetWindowPos> call, to position HEAS GUI 44 directly behind application 21 GUI 43 in such a manner that application 21 GUI 43 is displayed like an MDI child of HEAS GUI 44 (step 540).

Figure 6A:
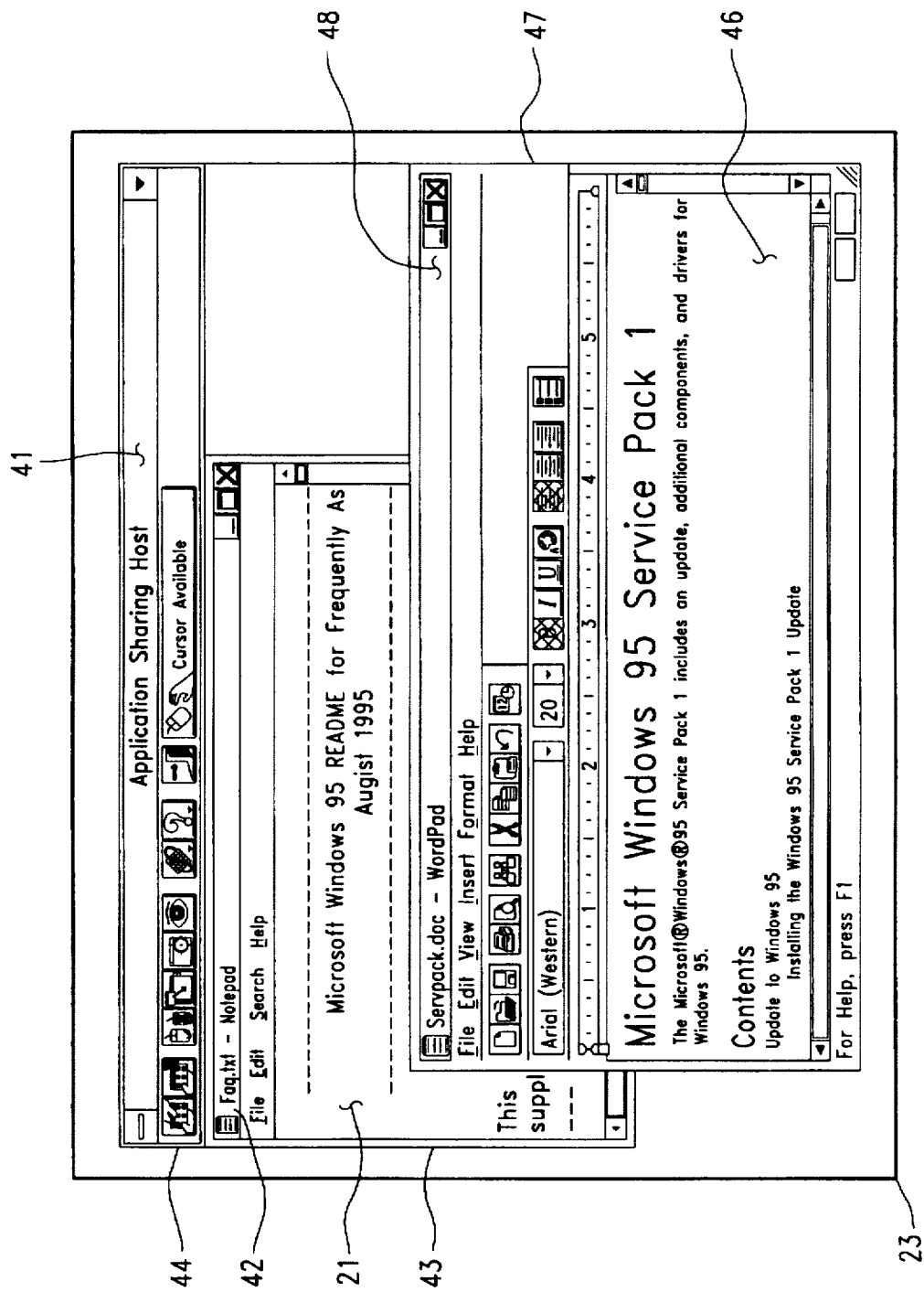
FIG. 6A is a replication of the GUIs of the HEAS and the first and second applications when the second application is active and is being shared.
Figure 6B:
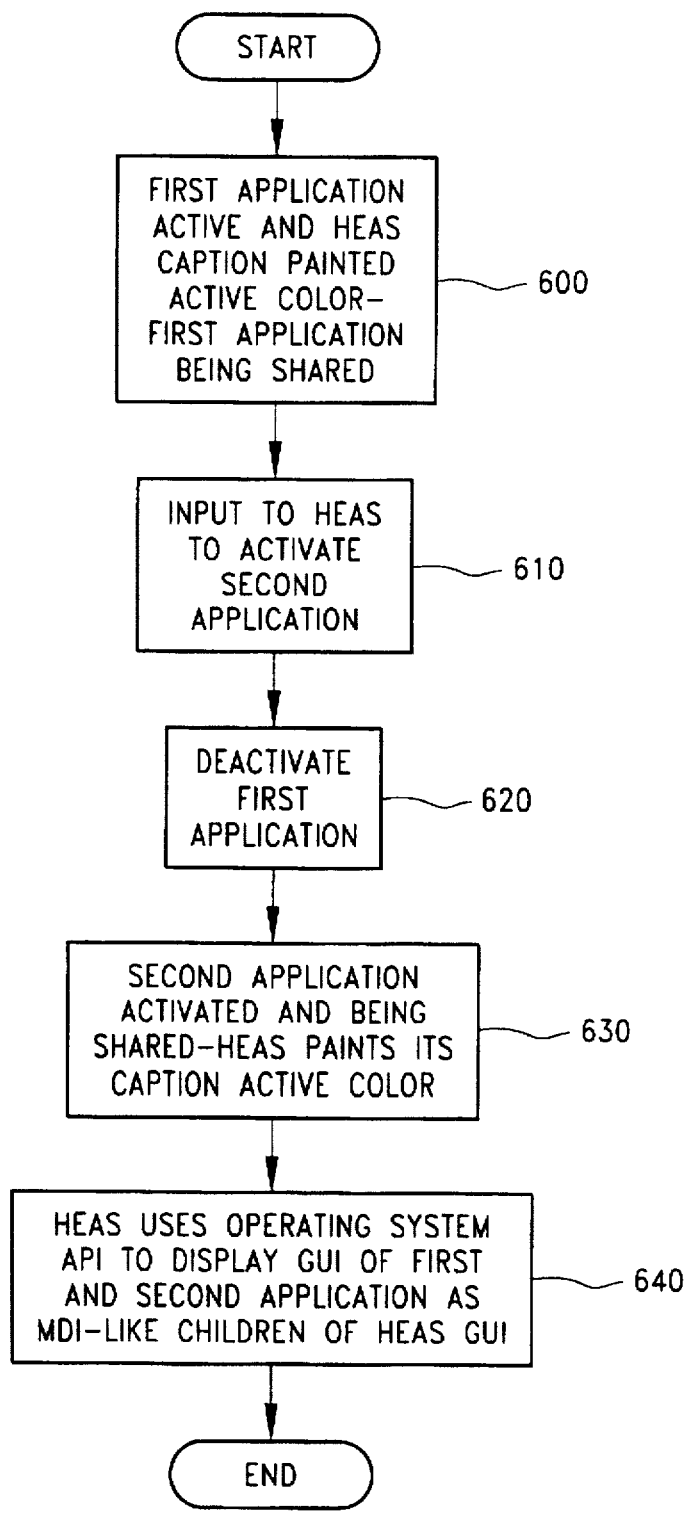
FIG. 6B is a flow chart showing the steps illustrated in FIG. 6A.

FIGS. 6A and 6B show the functionality of the invention when initiating the sharing of a second application. For example, from the scenario depicted in FIG. 5A (application 21 is active and being shared)(step 600 of FIG. 6B), a user can, by appropriate input through HEAS GUI 44, request the sharing of a second application, such as application 46 (step 610). An instruction to HEAS to share an application typically is the type of action which will cause deactivation of an application already being shared. Therefore, application 21 will be deactivated (step 620) while a user makes the necessary input to commence sharing of application 46. HEAS 18 causes activation of application 46, which now can be shared with one or more guests, such as guest 30 (step 630). HEAS will maintain its caption the active color during activation of application 46. Operating system 27 will administrate proper Z-ordering, namely overlaying application 46 GUI 47 on application 21 GUI 43. HEAS 18 uses the API of operating system 27 to display both application 46 GUI 47 and application 21 GUI 43 as MDI-like children of HEAS GUI 44 (step 640). In an embodiment of the invention, HEAS 18 will use the <EnumTaskWindows> API call in a "MICROSOFT" "WINDOWS" operating system environment or an equivalent command in another operating system environment to obtain a handle of, or equivalent information identifying, the window-like GUIs of every application currently being shared. Thereafter, in a preferred embodiment, the <SetWindowPos> or equivalent call can be made to implement arrangement of the GUIs of all of the shared applications as MDI-like children of HEAS GUI 44. For example, note from FIG. 6A that the borders of HEAS GUI 44 encompass both application 21 and application 46. This feature makes clear to a user that application 46 (and inactive application 21) is being shared. Application 46 GUI 47 will overlay application 21 GUI 43 according to typical operating system functionality. Where there are plural applications running, some of which are shared, the others of which are unshared, the operating system will tend to the proper Z-ordering such that the GUI of the active application overlays the GUIs of the inactive applications. HEAS will tend to the MDI behavior to position HEAS GUI 44 behind the GUIs of the shared applications. When a shared application is active, HEAS will position HEAS GUI 44 beneath the lowest shared application overlaying the GUIs of the unshared, inactive applications.

From the scenario depicted in FIG. 6A, the active state can oscillate between application 46 and application 21 without affecting the active coloration of the caption of HEAS 18. For example, in either case, HEAS 18 recognizes that even though a shared application is being deactivated, for example by a WM_MOUSEACTIVATE or WM_ACTIVATE message from operating system 27, the application being activated also is a shared application. HEAS 18 will maintain its caption in the active color to indicate that application sharing is active, albeit for sharing of a different application. Operating system 27 will maintain the proper Z-ordering such that the GUI of the active application overlays the GUI of the inactive application. HEAS 18 will maintain the MDI child appearance of each of application 21 and application 46.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

When implemented on a general-purpose microprocessor, the computer program code segments configure the microprocessor to create specific logic circuits.

It should be understood that various changes in the details, materials, and arrangements of the parts which have been described and illustrated in order to explain the nature of this invention may be made by those skilled in the art without departing from the principle and scope of the invention as expressed in the following claims.

What we claim is:

1. A computer-implemented method for sharing an application, comprising the steps of:

(a) monitoring an activation message to one of an application-sharing application and a shared application, wherein the activation message is for an activation of the application-sharing application; and (b) supervising one or both of the application-sharing application and the shared application by the application-sharing application based on the activation message, wherein said supervising comprises preventing, with the application-sharing application, deactivation of the shared application.

2. The method of claim 1 wherein the activation message is for one of an activation and deactivation of the shared application and step (b) comprises one of the steps of:

rendering at least a portion of a graphical user interface of the application-sharing application in an active color; and rendering at least a portion of a graphical user interface of the application-sharing application in an inactive color.

3. The method of claim 1, wherein step (b) further comprises the step of:

rendering at least a portion of a graphical user interface of the application-sharing application in an active color.

4. The method of claim 1 wherein the activation message is for an activation of the application-sharing application and step (b) comprises the step of:

activating the shared application.

5. The method of claim 4 wherein step (b) further comprises the step of:

rendering at least a portion of a graphical user interface of the application-sharing application in an active color.

6. The method of claim 1 wherein step (a) comprises the step of hooking the activation message made by an operating system.

7. An apparatus for sharing an application, comprising:

(a) means for monitoring an activation message to one of an application-sharing application and a shared application, wherein the activation message is for an activation of the application-sharing application; and (b) means for supervising one or both of the application-sharing application and the shared application by the application-sharing application based on the activation message, wherein said supervising comprises preventing, with the application-sharing application, deactivation of the shared application.

8. The apparatus of claim 7, wherein the activation message is for one of an activation and deactivation of the shared application and means (b) comprises:

means for rendering at least a portion of a graphical user interface of the application-sharing application in an active color; and means for rendering at least a portion of a graphical user interface of the application-sharing application in an inactive color.

9. The apparatus of claim 7, wherein means (b) further comprises:

means for rendering at least a portion of a graphical user interface of the application-sharing application in an active color.

10. The apparatus of claim 7, wherein the activation message is for an activation of the application-sharing application and means (b) comprises:

means for activating the shared application.

11. The apparatus of claim 10, wherein means (b) further comprises:

means for rendering at least a portion of a graphical user interface of the application-sharing application in an active color.

12. The apparatus of claim 7, wherein means (a) comprises means for hooking the activation message made by an operating system.

13. A storage medium encoded with machine-readable computer program code for sharing an application, comprising:

(a) means for causing a computer to monitor an activation message to one of an application-sharing application and a shared application, wherein the activation message is for an activation of the application-sharing application; and (b) means for causing the computer to supervise one or both of the application-sharing application and the shared application by the application-sharing application based on the activation message, wherein said supervising comprises preventing, with the application-sharing application, deactivation of the shared application.

14. The storage medium of claim 13, wherein the activation message is for one of an activation and deactivation of the shared application and means (b) comprises:

means for causing the computer to render at least a portion of a graphical user interface of the application-sharing application in an active color; and means for causing the computer to render at least a portion of a graphical user interface of the application-sharing application in an inactive color.

15. The storage medium of claim 13, wherein means (b) further comprises:

means for causing the computer to render at least a portion of a graphical user interface of the application-sharing application in an active color.

16. The storage medium of claim 13, wherein the activation message is for an activation of the application-sharing application and means (b) comprises:

means for causing the computer to activate the shared application.

17. The storage medium of claim 16, wherein means (b) further comprises:

means for causing the computer to render at least a portion of a graphical user interface of the application-sharing application in an active color.

18. The storage medium of claim 13, wherein means (a) comprises means for hooking the activation message made by an operating system.

19. A system for sharing an application, comprising:

(a) a processor;

(b) a display subsystem;

(c) an operating system;

(d) a shared application; and (e) an application-sharing application; wherein the processor:

(1) monitors an activation message to one of the application-sharing application and the shared application, wherein the activation message is for an activation of the application-sharing application; and (2) supervises one or both of the application-sharing application and the shared application by the application-sharing application based on the activation message, wherein said supervising comprises preventing, with the application-sharing application, deactivation of the shared application.

20. The system of claim 19, wherein the processor supervises one or both of the application-sharing application and the shared application by:

instructing the display subsystem to render at least a portion of a graphical user interface of the application-sharing application in an active color; and instructing the display subsystem to render at least a portion of the graphical user interface of the application-sharing application in an inactive color.

21. The system of claim 19, wherein the processor further supervises one or both of the application-sharing application and the shared application by:

instructing the display subsystem to render at least a portion of a graphical user interface of the application-sharing application in an active color.

22. The system of claim 19, wherein the processor supervises one or both of the application-sharing application and the shared application by:

activating the shared application.

23. The system of claim 22, wherein the processor further supervises one or both of the application-sharing application and the shared application by:

instructing the display subsystem to render at least a portion of a graphical user interface of the application-sharing application in an active color.

24. The system of claim 19, wherein the processor monitors an activation message to one of an application-sharing application and a shared application by receiving information from the application-sharing application of the activation message made by the operating system.

25. A computer-implemented method for sharing an application, comprising the steps of: (a) monitoring an activation message to one of an application-sharing application and a shared application, wherein the activation message is for an activation of either of the shared application and the application-sharing application; and (b) arranging, with the application-sharing application, in response to the activation message, a graphical user interface of the application-sharing application and the shared application in a manner such that the graphical user interface of the shared application appears dependent on the graphical user interface of the application-sharing application.

26. The method of claim 25, wherein there are a plurality of shared applications, each having a graphical user interface, and step (b) comprises the step of arranging the graphical user interfaces of the application-sharing application and the plurality of shared applications in a manner such that the graphical user interfaces of the plurality of shared applications appear dependent from the graphical user interface of the application-sharing applications.

27. An apparatus for sharing an application, comprising:
(a) means for monitoring an activation message to one of an application-sharing application and a shared application, wherein the activation message is for an activation of either of the shared application and the application-sharing application; and
(b) means for arranging, with the activation message application-sharing application, in response to the activation message, a graphical user interface of the application-sharing application and the shared application in a manner such that the graphical user interface of the shared application appears dependent on the graphical user interface of the application-sharing application.

28. A computer-implemented method for sharing an application, comprising the steps of:
(a) monitoring an activation message for activating one of an application-sharing application and a shared application; and
(b) when the activation message is for an activation of the application-sharing application, then preventing, with the application-sharing application, activation of the application-sharing application and deactivation of the shared application and rendering the application-sharing application so that it appears activated, and, when the activation message is for an activation of the shared application, then rendering the application-sharing application so that it appears activated.

29. An apparatus for sharing an application, comprising:
(a) means for monitoring an activation message for activating one of an application-sharing application and a shared application; and
(b) means for preventing, with the application-sharing application, activation of the application-sharing application and deactivation of the shared application and for rendering the application-sharing application so that it appears activated, when the activation message is for an activation of the application-sharing application, and for rendering the application-sharing application so that it appears activated, when the activation message is for an activation of the shared application.

* * * * *